United States Patent
Chen et al.

(10) Patent No.: US 9,350,620 B2
(45) Date of Patent: May 24, 2016

(54) METHOD FOR CREATING RING NETWORK LABEL SWITCHED PATH, RELATED DEVICE, AND COMMUNICATIONS SYSTEM

(71) Applicant: HUAWEI TECHNOLOGIES CO., LTD., Shenzhen, Guangdong (CN)

(72) Inventors: Guoyi Chen, Beijing (CN); Lianshu Zheng, Beijing (CN); Jie Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 14/332,860

(22) Filed: Jul. 16, 2014

(65) Prior Publication Data

US 2014/0348028 A1 Nov. 27, 2014

Related U.S. Application Data

(63) Continuation of application No. PCT/CN2013/070058, filed on Jan. 5, 2013.

(30) Foreign Application Priority Data

Jan. 17, 2012 (CN) .......................... 2012 1 0013863

(51) Int. Cl.
*H04L 12/437* (2006.01)
*H04L 12/723* (2013.01)
(Continued)

(52) U.S. Cl.
CPC .......... *H04L 41/12* (2013.01); *H04L 12/40013* (2013.01); *H04L 12/437* (2013.01); *H04L 12/4633* (2013.01); *H04L 12/4637* (2013.01); *H04L 45/50* (2013.01); *H04L 45/28* (2013.01)

(58) Field of Classification Search
None
See application file for complete search history.

(56) References Cited

U.S. PATENT DOCUMENTS 7,298,700 B1 11/2007 Doverspike et al.
7,742,482 B1 * 6/2010 Aggarwal ........... H04L 12/5695
370/395.3

(Continued)

FOREIGN PATENT DOCUMENTS

CN 1921453 A 8/2007
CN 101599862 A 12/2009

(Continued)

OTHER PUBLICATIONS

International Search Report mailed Apr. 11, 2013, in corresponding International Patent Application No. PCT/CN2013/070058.

(Continued)

*Primary Examiner* — Robert C Scheibel
(74) *Attorney, Agent, or Firm* — Staas & Halsey LLP

(57) ABSTRACT

Embodiments of the present invention disclose a method for creating a ring network label switched path. The method includes: receiving, by a first node, a first Path message used for creating a first label switched path from a second node; allocating a first label to the first label switched path; sending a first Resv message carrying the first label to the second node; and when the first node receives a second Path message and determines that a destination node of the second label switched path is the same as that of the first label switched path, allocating the first label to the second label switched path; and sending a second Resv message carrying the first label to the second node. Solutions of the embodiments of the present invention helps reduce the number of created ring network label switched paths and maintenance complexity.

13 Claims, 6 Drawing Sheets

(51) Int. Cl.
*H04L 12/24* (2006.01)
*H04L 12/40* (2006.01)
*H04L 12/46* (2006.01)
*H04L 12/703* (2013.01)

(56) References Cited

U.S. PATENT DOCUMENTS

2012/0008632 A1    1/2012   Liu et al.
2012/0093165 A1*   4/2012   Guo .................... H04L 12/5695
                                                             370/400
2012/0281705 A1*  11/2012   Ye ........................... H04L 45/28
                                                             370/395.5

FOREIGN PATENT DOCUMENTS

| CN | 101877892 A | 11/2010 |
|----|-------------|---------|
| CN | 102035714 A | 4/2011  |
| CN | 102143043 A | 8/2011  |
| CN | 102158396 A | 8/2011  |
| CN | 102201985 A | 9/2011  |
| JP | 2007-214899 | 8/2007  |
| JP | 2011-124897 | 6/2011  |

OTHER PUBLICATIONS

International Search Report issued Apr. 11, 2013 in corresponding international Patent Application No. PCT/CN2013/070058.

Extended European Search Report issued Dec. 1, 2014 in corresponding European Patent Application No. 13738884.9.

* cited by examiner

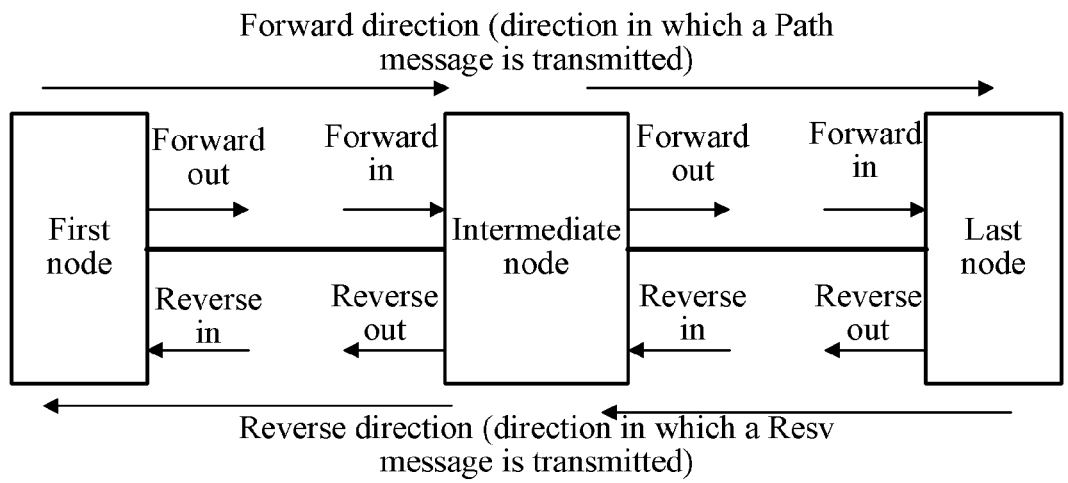
FIG. 1-a
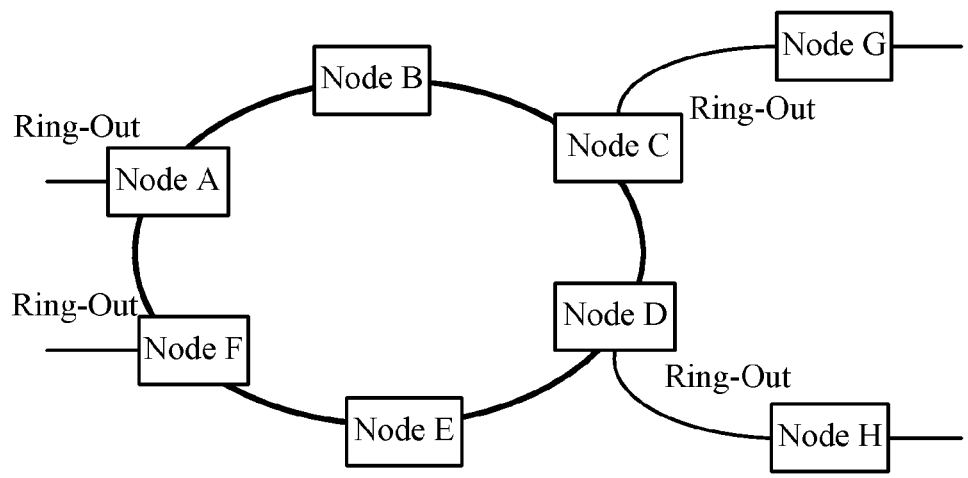
FIG. 1-b

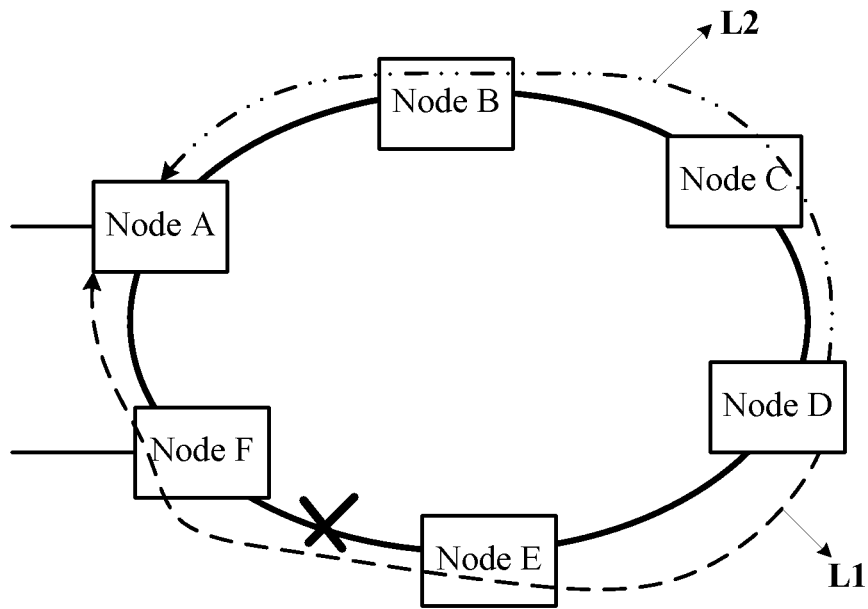
FIG. 5
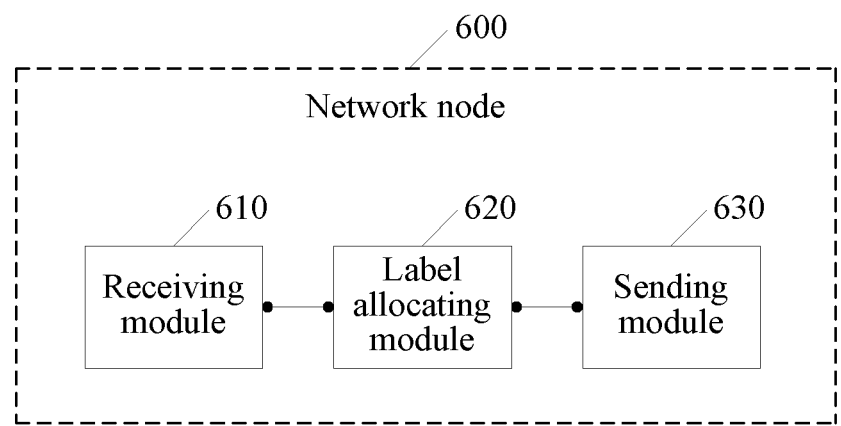
FIG. 6-a

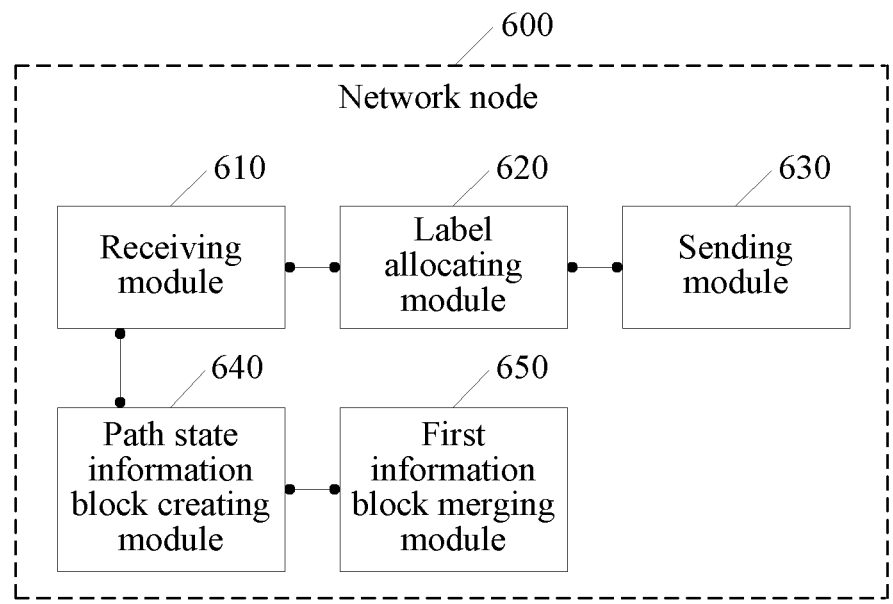
FIG. 6-b
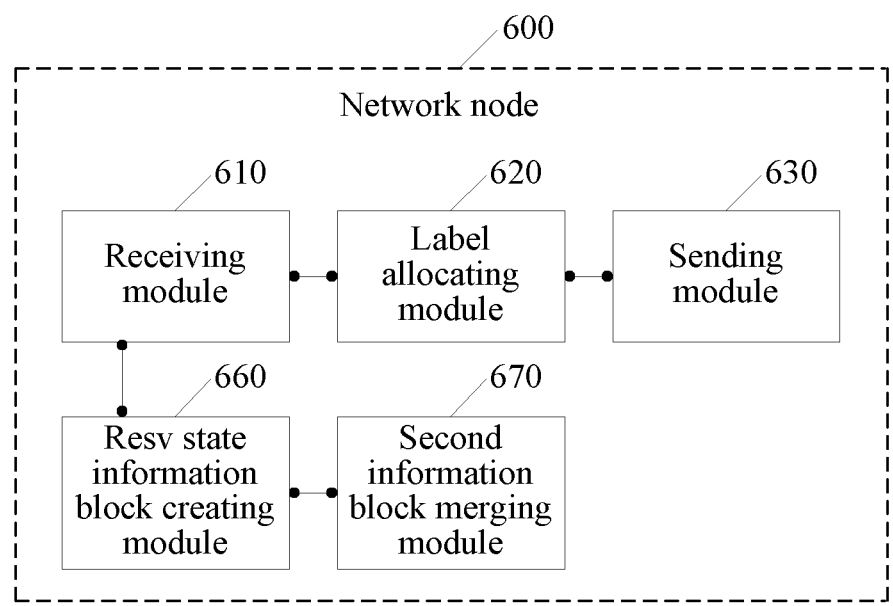
FIG. 6-c

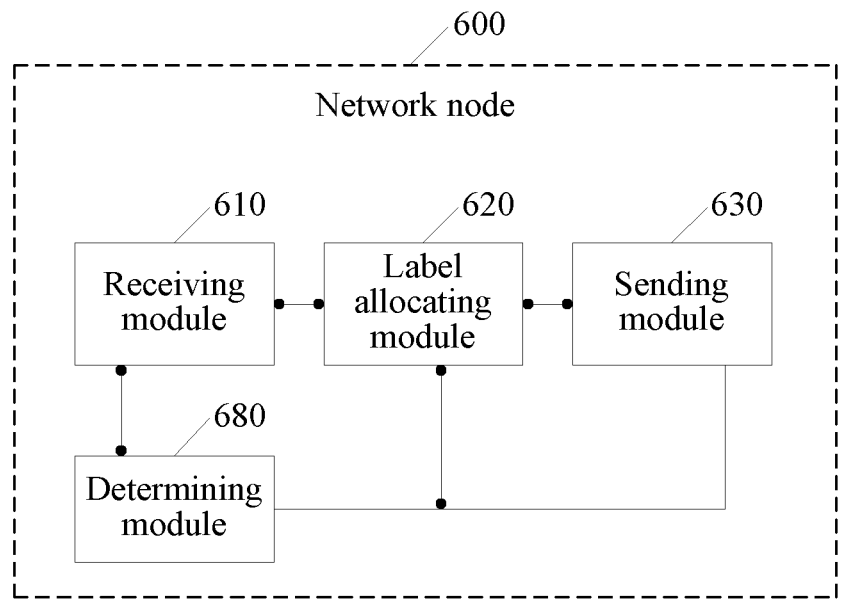
FIG. 6-d
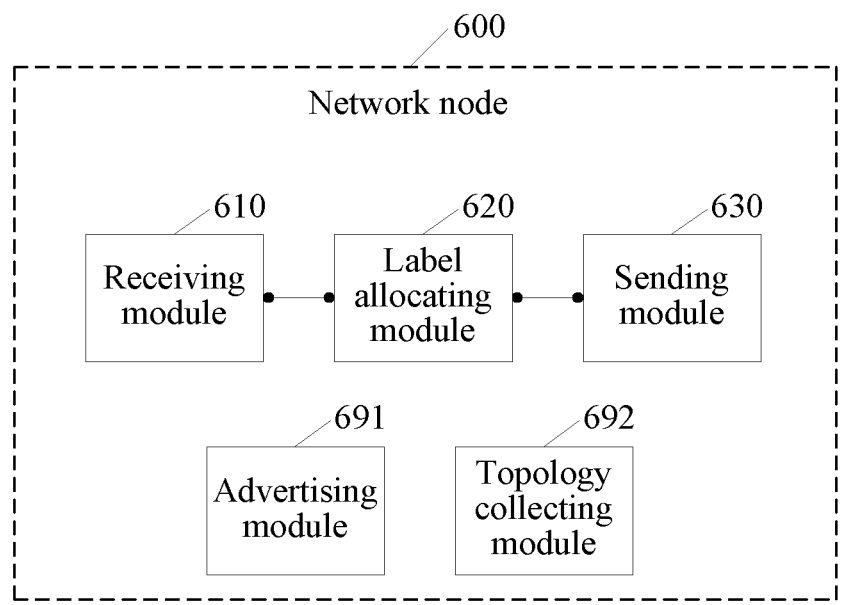
FIG. 6-e

METHOD FOR CREATING RING NETWORK LABEL SWITCHED PATH, RELATED DEVICE, AND COMMUNICATIONS SYSTEM

CROSS-REFERENCE TO RELATED APPLICATIONS

This application is a continuation of International Application No. PCT/CN2013/070058, filed on Jan. 5, 2013, which claims priority to Chinese Patent Application No. 201210013863.3, filed on Jan. 17, 2012, both of which are hereby incorporated by reference in their entireties.

TECHNICAL FIELD

The present invention relates to the field of communications technologies, and in particular, to a method for creating a ring network label switched path, a related device, and a communications system.

BACKGROUND

Network availability is a critical indicator for operators. The network availability directly affects the fulfillment of the service level agreement (SLA, Service Level Agreement) by the operators.

A ring network protection mechanism is an important means for ensuring high network availability. To implement inter-node communication and protection, two point to point (P2P, Point to Point) label switched paths (LSP, Label Switched Path), namely, a master point to point LSP and a backup point to point LSP, are created between each two nodes in an existing access ring network.

LSP protection switching mainly adopts a Wrapping or Steering manner.

It is found in practice that, because ring network protection is implemented by creating two point to point LSPs, namely, a primary point to point LSP and a secondary point to point LSP, between each two nodes in an access ring network in the prior art, the number of point to point LSPs created for ring network protection increases exponentially as the number of nodes on the ring network increases, leading to large control overhead of the point to point LSPs.

SUMMARY

Embodiments of the present invention provide a method for creating a ring network label switched path, a device, and a communications system, so as to reduce the number of created ring network label switched paths and maintenance complexity.

To solve the foregoing technical problem, the embodiments of the present invention provide the following technical solutions:

In one aspect, an embodiment of the present invention provides a method for creating a ring network label switched path, including:

receiving, by a first node, a first Path message used for creating a first label switched path from a second node;

allocating, by the first node, a first label to the first label switched path;

sending, by the first node, a first Resv message carrying the first label to the second node; and when the first node receives a second Path message used for creating a second label switched path from the second node and determines that a destination node of the second label switched path is the same as that of the first label switched path, and the first node, the second node, and the destination node are located in a same ring network, allocating, by the first node, the first label to the second label switched path; and sending, to the second node, a second Resv message carrying the first label allocated to the second label switched path.

In another aspect, an embodiment of the present invention further provides a network node, including:

a receiving module, configured to receive a first Path message used for creating a first label switched path from a second node;

a label allocating module, configured to allocate a first label to the first label switched path; and a sending module, configured to send a first Resv message carrying the first label to the second node; where the label allocating module is further configured to: when the receiving module receives a second Path message used for creating a second label switched path from the second node and determines that a destination node of the second label switched path is the same as that of the first label switched path, and the network node, the second node, and the destination node are located in a same ring network, allocate the first label to the second label switched path; and the sending module is further configured to send, to the second node, a second Resv message carrying the first label allocated to the second label switched path by the label allocating module.

In another aspect, an embodiment of the present invention further provides a communications system, including:

the network node according to the foregoing embodiment.

It can be seen from the foregoing that, in the embodiments of the present invention, a first node receives a first Path message used for creating a first label switched path from a second node; allocates a first label to the first label switched path; sends a first Resv message carrying the first label to the second node; and when the first node receives a second Path message used for creating a second label switched path from the second node and determines that a destination node of the second label switched path is the same as that of the first label switched path, and the first node, the second node, and the destination node are located in a same ring network, allocates the first label to the second label switched path; and sends, to the second node, a second Resv message carrying the first label allocated to the second label switched path. Based on this mechanism, a node in a ring network allocates a same path label to identical path segments of LSPs passing through the node and having a same destination node, so as to merge identical path segments of LSPs having a same destination node on the ring network to some extent, which helps greatly reduce the number of LSPs to be created and maintained by each node on the ring network, and further reduces the LSP control overhead.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1-*a* is a schematic indication diagram of a message sending direction according to an embodiment of the present invention;

FIG. 1-*b* is a schematic structural diagram of a network topology according to an embodiment of the present invention;

FIG. 5 is a schematic diagram of failover in a ring network according to an embodiment of the present invention;

FIG. 6-*a* is a schematic diagram of a network node according to an embodiment of the present invention;

FIG. 6-*b* is a schematic diagram of another network node according to an embodiment of the present invention;

FIG. 6-*c* is a schematic diagram of another network node according to an embodiment of the present invention;

FIG. 6-*d* is a schematic diagram of another network node according to an embodiment of the present invention; and FIG. 6-*e* is a schematic diagram of another network node according to an embodiment of the present invention.

DESCRIPTION OF EMBODIMENTS

Figure 2:
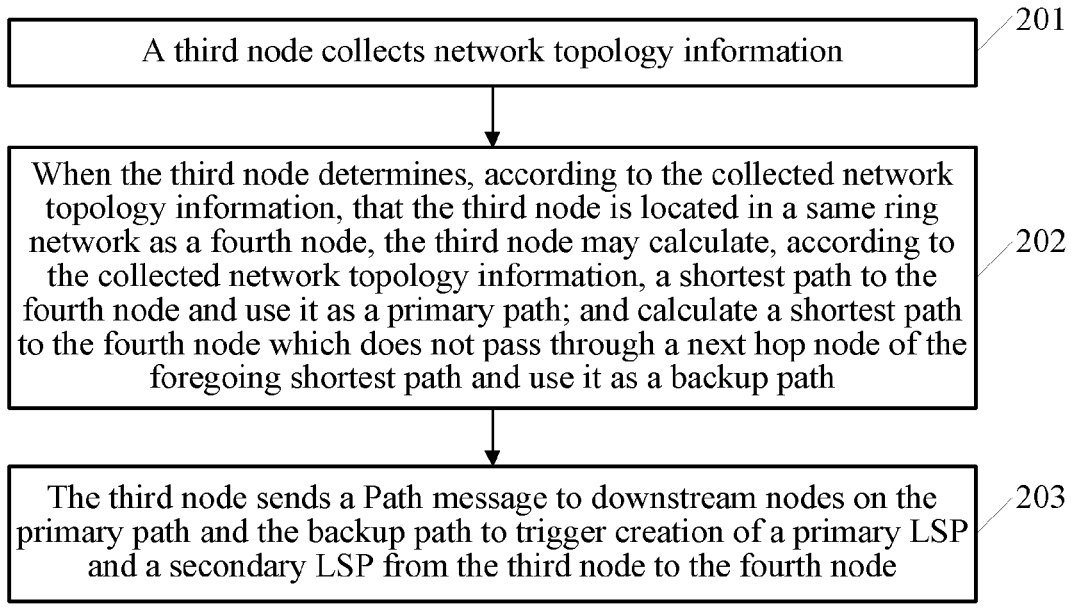
FIG. 2 is a schematic flow chart of a method for creating a ring network LSP according to an embodiment of the present invention.

Embodiments of the present invention provide a method for creating a ring network LSP, a related device, and a communications system, so as to reduce the number of created ring network label switched paths and the maintenance complexity.

To make the objectives, features, and advantages of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Detailed descriptions are provided in the following, separately.

Reliability of network service transmission may be achieved by using various protection and recovery technologies, for example, a network connection may be recovered by using a rerouting technology of a control plane. A control plane is a control network running in a network, a corresponding control channel is provided by the network, and a multi-protocol label switching (MPLS, Multi-Protocol Label Switching) protocol family runs on the control plane. The MPLS protocol family includes a routing protocol, a signaling protocol, and so on, where the routing protocol is mainly responsible for collecting network topology information (including node and link information, and the like) and calculating a path that a connection passes through; and the signaling protocol is mainly responsible for creating a network connection according to a calculated path.

In the embodiments of the present invention, for the signaling protocol of a control plane in a ring network, for example, a MPLS resource reservation protocol-traffic engineering (RSVP-TE, Resource reSerVation Protocol-Traffic Engineering) is adopted. Certainly, appropriate extension can be performed on the RSVP-TE protocol. A message and an object mentioned in the embodiments of the present invention may be a message and an object in the MPLS RSVP-TE.

First referring to FIG. 1-*a*, to better understand the description, a direction for transferring service data from a first node to a last node is referred to as a Downstream direction, and may also be referred to as a forward direction, that is, a direction in which a path request (Path) message is sent; whereas, a direction for transferring a resource reservation (Resv) message corresponding to the Path message from the last node to the first node is referred to as an Upstream direction, and may also be referred to as a reverse direction, that is, a direction in which a Resv message is sent. The Path message is a message type defined in the RSVP-TE. A Path message may be sent from a source node (the first node) to a destination node (the last node) along a calculated path, so as to instruct all nodes along the path to create a connection. The Resv message is also a message type defined in the RSVP-TE. A Resv message may be sent from the last node to the source node. An LSP connection may be created by using a Resv message along with a Path message.

For each node, a direction in which a Path message is received is referred to as a forward incoming direction, a direction in which a Path message is sent is referred to as a forward outgoing direction, a direction in which a Resv message is received is referred to as a reverse incoming direction, and a direction in which a Resv message is sent is referred to as a reverse outgoing direction. A node between the first node and the last node may be referred to as an intermediate node. The number of the intermediate nodes may be 0, 1, or more. A node which sends a Path message may be referred to as an upstream node and a node which receives a Path message is a downstream node. Similarly, a node which sends a Resv message may be referred to as a downstream node and a node which receives a Resv message is an upstream node. It can be understood that an upstream node and a downstream node are relative. Certainly, the first node may be referred to as an upstream node of all the other nodes and the last node may be referred to as a downstream node of all the other nodes.

The aforementioned concepts may be applied to the description of the following embodiments.

For example, as shown in FIG. 1-*b*, FIG. 1-*b* shows a ring network topology structure. A node A, a node B, a node C, node D, a node E, and a node F are located in a same ring network. The solution of the embodiments of the present invention is mainly applied to creation of a ring network LSP. A ring node mentioned in the following embodiments of the present invention is a shortened form for a node located in a ring network.

According to an embodiment of a method for creating a ring network label switched path of the present invention, the method may include:

collecting, by a third node, network topology information; when the third node determines, according to the collected network topology information, that the third node is located in a same ring network as a fourth node, calculating, by the third node, according to the collected network topology information, a shortest path to the fourth node and taking it as a primary path; calculating a shortest path to the fourth node which does not pass through a next hop node of the foregoing shortest path and taking it as a backup path; and sending, by the third node, a Path message to nodes on the primary path and the backup path, so as to trigger creation of a primary LSP and a secondary LSP from the third node to the fourth node.

Referring to FIG. 2, a method for creating a ring network label switched path provided in an embodiment of the present invention includes:

201: A third node collects network topology information.

In a feasible implementation manner, each node on a ring network (which may be referred to as a ring node), for example, may implement advertisement and discovery of a ring network topology by using an interior gateway protocol (IGP, Interior Gateway Protocol) or another protocol, so that each node on the ring network may learn a ring network topology structure. For example, a ring identifier (Ring ID) may be configured for each node or an interface of each node on the ring network, where the Ring ID may identify a home ring of each node and an interface of each node (namely, a ring network to which each node and the interface of each node belong). Each node, for example, may advertise a Ring ID of the interface of each node as a part of an interface parameter to another network node through a type-length-value (TLV, Type-Length-Value) field (or another field) of an extended IGP protocol message, thereby enabling another node (for example, a router) in the network to learn which interfaces of which nodes in the network are located in a same ring network (Ring IDs of interfaces of nodes located in the same ring network are the same).

The third node may collect network topology information. The network topology information includes: a ring identifier that is advertised by at least another one node in the same ring network where the third node is located, and is corresponding to the at least another one node or at least one interface of the at least another one node.

The third node may also advertise the ring identifier corresponding to the third node or at least one interface of the third node, so that another node collects network topology information.

202: When the third node determines, according to the collected network topology information, that the third node is located in a same ring network as a fourth node, the third node may calculate, according to the collected network topology information, a shortest path to the fourth node and use it as a primary path; and calculate a shortest path to the fourth node which does not pass through a next hop node of the foregoing shortest path and use it as a backup path.

Nodes that the primary path and the backup path from the third node to the fourth node pass through are all located in the same ring network.

203: The third node sends a Path message to downstream nodes on the primary path and the backup path to trigger creation of a primary LSP and a secondary LSP from the third node to the fourth node.

In a feasible implementation manner, the third node may carry an indication of allowing LSP merging in a Path message that is sent to a downstream node on the primary path (and/or the backup path) to the fourth node, so as to indicate that an LSP that the Path message triggers to create allows being merged (merge), according to which the downstream node on the primary path (and/or the backup path) from the third node to the fourth node may learn that merging processing is allowed for identical path segments (where, all nodes on the identical path segments are also nodes on the same ring network) between the LSP that the Path message triggers to create and an LSP that another node on the same ring network triggers to create and having a same destination node (that is, both the destination nodes are the fourth node). The indication of allowing LSP merging may include, for example, a ring identifier (Ring ID), so as to indicate that the LSP is initiated by a node on a ring network. Herein, it is assumed that identical path segments (where all nodes on the identical path segments are also nodes on the same ring network) of LSPs initiated by nodes on the same ring network and having the same destination node (where the destination node is also a node on the same ring network) are allowed to be merged. Certainly, the Path message may also not carry an indication of allowing LSP merging. At this time, if another node on the ring network is informed that the Path message is initiated by a node on the ring network, it may be considered by default that merging processing is allowed for identical path segments between the LSP that the Path message triggers to create and an LSP that another node on the ring network triggers to create and having the same destination node. Alternatively, at this time, another node on the ring network may also directly allow, by default, merging processing on identical path segments between the LSP that the Path message triggers to create and an LSP that another node triggers to create and having the same destination node.

It can be understood that the third node and another node located in the same ring network as the third node similarly may trigger, based on the foregoing mechanism, to create a primary LSP and a secondary LSP to another node on the ring network. Specifically, the third node and another node located in the same ring network as the third node similarly may also trigger, based on the foregoing mechanism, to create a primary LSP to another node on the ring network, but do not trigger to create a secondary LSP.

According to another embodiment of the method for creating a ring network label switched path of the present invention, the method may include: receiving, by a first node, a first Path message used for creating a first label switched path from a second node; allocating, by the first node, a first label to the first label switched path; sending, by the first node, a first Resv message carrying the first label to the second node; and when the first node receives a second Path message used for creating a second label switched path from the second node and determines that a destination node of the second label switched path is the same as that of the first label switched path, and the first node, the second node, and the destination node are located in a same ring network, allocating, by the first node, the first label to the second label switched path; and sending, to the second node, a second Resv message carrying the first label allocated to the second label switched path.

Figure 3:
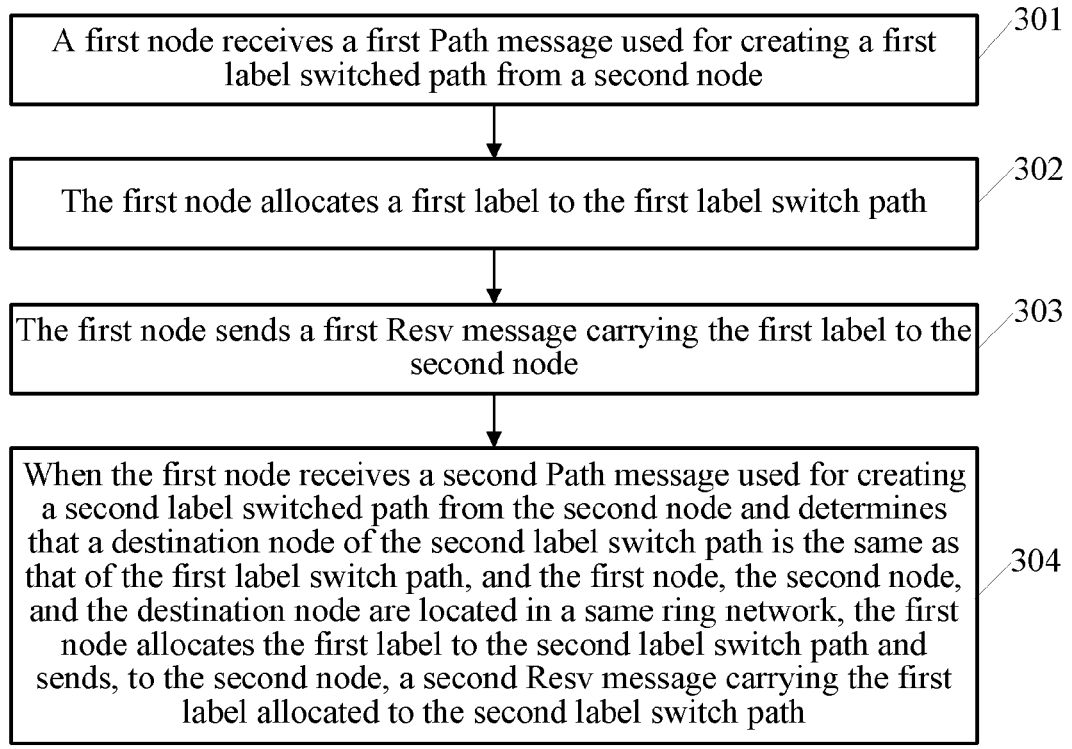
FIG. 3 is a schematic flow chart of a method for creating a ring network LSP according to an embodiment of the present invention.

Referring to FIG. 3, another method for creating a ring network label switched path provided in an embodiment of the present invention includes:

301: A first node receives a first Path message used for creating a first label switched path from a second node.

The second node may be a source node of the first label switched path. Certainly, the second node may also be an intermediate node of the first label switched path. The first node may be a destination node of the first label switched path. Certainly, the first node may also be an intermediate node of the first label switched path.

In a feasible implementation manner, each node on a ring network (which may be briefly referred to as a ring node), for example, may implement advertisement and discovery of a ring network topology by using an interior gateway protocol (IGP) or another protocol, so that each node on the ring network may learn a ring network topology structure. For example, a ring identifier (Ring ID) may be configured for each node or an interface of each node on the ring network, where the Ring ID may identify a home ring of each node and an interface of each node (namely, a ring network to which each node and the interface of each node belong). Each node, for example, may advertise a Ring ID of the interface of each node as a part of an interface parameter to another network node through a type-length-value (TLV) field (or another field) of an extended IGP protocol message, thereby enabling another node (for example, a router) in the network to learn which interfaces of which nodes in the network are located in a same ring network (Ring IDs of interfaces of nodes located in the same ring network are the same).

For example, the first node may also advertise a Ring ID corresponding to the first node or at least one interface of the first node; and/or the first node may collect network topology information; the network topology information includes: a Ring ID that is advertised by at least another one node in the same ring network where the first node is located and is corresponding to the at least another one node or at least one interface of the at least another one node.

302: The first node allocates a first label to the first label switched path.

303: The first node sends a first Resv message carrying the first label to the second node.

If the first Path message indicates that the first label switched path has a resource requirement (for example, the first label switched path has a bandwidth resource requirement), the first node may also reserve a corresponding resource for the first label switched path. At this time, the first Resv message may carry description information of the resource that the first node reserves for the first label switched path. Certainly, the first Resv message may also not carry description information of the resource that the first node reserves for the first label switched path, and after receiving the first Resv message corresponding to the first label switched path, the second node may take it by default that the required resource is already reserved for the first label switched path by the first node. The second node subsequently may send a service flow to the first node based on the first label carried in the first Resv message.

304: When the first node receives a second Path message used for creating a second label switched path from the second node and determines that a destination node of the second label switched path is the same as that of the first label switched path, and the first node, the second node, and the destination node are located in the same ring network, the first node allocates the first label to the second label switched path; and sends, to the second node, a second Resv message carrying the first label allocated to the second label switched path by the first node.

It can be understood that, when the first node receives a second Path message used for creating a second label switched path from the second node and determines that a destination node of the second label switched path is the same as that of the first label switched path, and the first node, the second node, and the destination node are located in the same ring network, it indicates that the second label switched path and the first label switched path have identical path segments (herein, the identical path segments include a path segment from the second node to the destination node). Therefore, a node on the identical path segments may process the second label switched path and the first label switched path. The first node is a node on the identical path segments. Therefore, a label allocated by the first node to the second label switched path is the same as a label allocated by the first node to the first label switched path (referred to as a first label). In this way, merging processing on identical path segments between the first label switched path and the second label switched path is implemented to some extent, and the identical path segments use the same path label.

If the second Path message indicates that the second label switched path has a resource requirement (for example, the second label switched path has a bandwidth resource requirement), the first node may also reserve a corresponding resource for the second label switched path. At this time, the second Resv message may carry description information of the resource that the first node reserves for the second label switched path. Certainly, the second Resv message may also not carry description information of the resource that the first node reserves for the second label switched path, and after receiving the second Resv message corresponding to the second label switched path, the second node may take it by default that the required resource is already reserved for the second label switched path by the first node. The second node subsequently may send a service flow (the service flow may be initially sent by the source node of the first label switched path, and may also be initially sent by the source node of the second label switched path) to the first node based on the first label.

It should be noted that the description information of a certain object mentioned in the embodiments of the present invention (for example, description information of a certain reserved resource) may be the object itself, or may also be any other information that can indicate the object.

In a feasible implementation manner, the first Path message may carry a ring identifier of a ring network where a source node corresponding to the first label switched path is located. The second Path message may carry a ring identifier of a ring network where a source node corresponding to the second label switched path is located. The ring identifier of the ring network where the source node corresponding to the first label switched path is located is the same as the ring identifier of the ring network where the source node corresponding to the second label switched path is located, which indicates that the source node corresponding to the first label switched path and the source node corresponding to the second label switched path are located in the same ring network.

In a feasible implementation manner, after the first node receives a first Path message from the second node and used for creating a first label switched path, the first node creates a Path state information block for the first label switched path. After the first node receives a second Path message used for creating a second label switched path from the second node, the first node creates a Path state information block for the second label switched path, and may merge the Path state information blocks created for the first label switched path and the second label switched path (herein, the merging the Path state information, for example, may include retaining different information and de-duplicate identical information in the Path state information block corresponding to the first label switched path and the Path state information block corresponding to the second label switched path, so as to further obtain a merged Path state information block). By merging Path state information blocks by the first node, the LSP state information volume and the number of Path state information blocks to be maintained by the first node, and so on may be reduced relatively.

A person skilled in the art should understand that the so-called generating a Path state information block corresponding to an LSP and then merging Path state information blocks does not necessarily refer to first generating an actually existing data structure of a Path state information block, but may form, by using some indication information, a Path state information block that is flexible in a form, and the form of the indication information may be varied.

In a feasible implementation manner, when the first node is an intermediate node on the first label switched path (herein, because the destination node of the first label switched path is the same as that of the second label switched path, the first node is also an intermediate node of the second label switched path), after receiving a first Path message from the second node and used for creating the first label switched path, the first node may send, to a downstream node of the first label switched path, a Path message used for creating the first label switched path. The first node may send the received first Path message to the downstream node, or may also perform format conversion or protocol conversion on the received first Path message, or add/delete/modify carried information and then send it to the downstream node. When the first node receives, from the downstream node of the first label switch path, a third Resv message corresponding to the first label switched path, the first node creates a Resv state information block for the first label switched path. After the first node receives a second Path message from the second node and used for creating the second label switched path, the first node may send, to a downstream node of the second label switched path, a Path message used for creating the first label switched path (similarly, the first node may transparently transmit the received second Path message to a downstream node, or, the first node may also perform format conversion or protocol conversion on the received second Path message, or add/delete/modify carried information and then send it to a downstream node). When the first node receives, from the downstream node of the second label switch path, a fourth Resv message corresponding to the second label switched path, the first node may create a Resv state information block for the second label switched path and merge the Resv state information blocks created for the first label switched path and the second label switched path. Similar to the merging of Path state information, the merging of Resv state information, for example, may include retaining different information and de-duplicate identical information in the Resv state information block corresponding to the first label switched path and the Resv state information block corresponding to the second label switched path, so as to obtain a merged Resv state information block. By merging the Resv state information blocks, the LSP state information volume, the number of Resv state information blocks, and the like to be maintained by the first node can be reduced relatively.

In another feasible implementation manner, when the first node is the destination node of the first label switched path (herein, because the first label switched path and the second label switched path have the same destination node, the first node is also the destination node of the second label switched path), after receiving a first Path message from the second node and used for creating the first label switched path, the first node sends a first Resv message carrying the first label to the second node. The first node may also create a Resv state information block for the first label switched path. After the first node receives a second Path message from the second node and used for creating the second label switched path, the first node sends a second Resv message carrying the first label to the second node. The first node may also create a Resv state information block for the second label switched path. The first node may merge the Resv state information blocks created for the first label switched path and the second label switched path. Similar to the merging of Path state information, the merging of Resv state information, for example, may include retaining different information and de-duplicate identical information in the Resv state information block corresponding to the first label switched path and the Resv state information block corresponding to the second label switched path, so as to obtain a merged Resv state information block. By merging the Resv state information blocks, the LSP state information volume, the number of Resv state information blocks, and the like to be maintained by the first node can be reduced relatively.

In particular, in a feasible implementation manner, when the first node is an intermediate node of the second label switched path, after the first node receives a second Path message from the second node and used for creating the second label switched path, the first node may determine whether the total resource requirement of the first label switched path and the second label switched path is equal to the resource requirement of the first label switched path (for example, no bandwidth resource requirement is specified for the second label switched path). If the total resource requirement of the first label switched path and the second label switched path is equal to the resource requirement of the first label switched path (that is, no bandwidth resource requirement is specified for the second label switched path), the first node may also not send, to a downstream node of the second label switched path, a Path message for creating the second label switched path. In this way, message exchange with a downstream node is reduced, and automatic merging on identical path segments between the second label switched path and the first label switched path (including a path segment from the first node to the destination node) is implemented, because in this situation, the identical path segments surely use the same path label. In this way, the LSP creation mechanism is further simplified.

It can be understood that the first node and another node on the ring network where the first node is located may also merge identical path segments of LSPs passing through the node and having the same destination address based on the foregoing LSP merging mechanism. However, in a non-ring network architecture, a node on an LSP may also merge identical path segments of LSPs passing through the node and having the same destination address by using a similar mechanism.

Based on the foregoing mechanism, it is assumed that a certain ring network includes N nodes. If each node is used as a destination node by another node on the ring network to establish two LSPs, namely, a primary LSP and a secondary LSP, after LSP merging processing is performed, only a total of 2N LSPs are required to implement uplink or downlink communication and communication between any nodes on the ring.

It can be seen from the foregoing, in this embodiment, the first node receives a first Path message from the second node and used for creating a first label switched path; allocates a first label to the first label switched path; sends a first Resv message carrying the first label to the second node; and if a second Path message used for creating a second label switched path from the second node is received and it is determined that a destination node of the second label switched path is the same as that of the first label switched path, and the first node, the second node, and the destination node are located in the same ring network, allocates the first label to the second label switched path and sends a second Resv message carrying the first label to the second node. Based on this mechanism, a node in a ring network allocates a same path label to identical path segments of LSPs passing through the node and having a same destination node, so as to merge identical path segments of LSPs having a same destination node on the ring network, which helps greatly reduce the number of LSPs to be created and maintained by each node on the ring network, and further reduces the LSP control overhead.

After the LSPs are created and merged, the first node may merge Path messages and/or Resv messages corresponding to identical path segments and used for state refreshing, and then send the messages (for example, the first node may merge Path messages and/or Resv messages corresponding to the first LSP and the second LSP and used for state refreshing, and then send the messages). For example, the first node may generate, based on the merged Path state information block, a Path message (where the Path message may carry description information of source nodes (multiple) and a destination node (one) of all the LSPs with identical path segments merged, and is used for refreshing the state of the merged LSPs) used for state refreshing and send the Path message to a downstream node. Similarly, the first node may also generate, based on the merged Resv state information block, a Resv message (where the Resv message may carry description information of source nodes (multiple) and a destination node (one) of all the LSPs with identical path segments merged, and is used for refreshing the state of the merged LSPs) used for state refreshing, and send the Resv message to an upstream node. In this way, the number of messages exchanged between all the nodes along the LSPs can be greatly reduced. Certainly, all the nodes passed through by the LSPs may also merge the Path/Resv state information blocks only and still send Path/Resv messages used for state refreshing to each LSP separately.

To better understand the foregoing solutions of the embodiments of the present invention, the following describes in detail by taking a specific application scenario as an example. The following describes by taking a method for creating a ring network label switched path LSP in a ring network shown in FIG. 1-b as an example.

Figure 4:
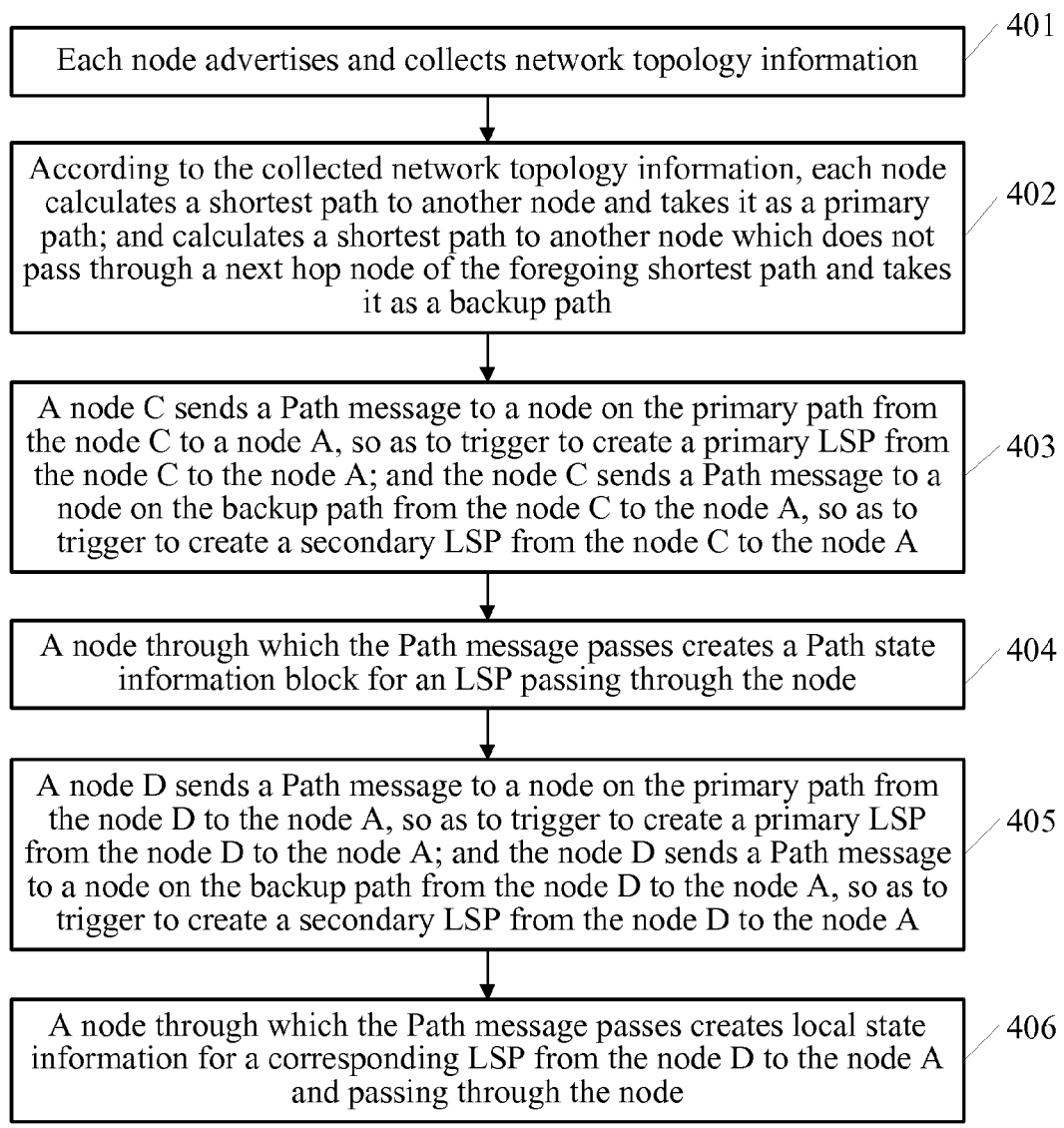
FIG. 4 is a schematic flow chart of a method for creating a ring network LSP according to an embodiment of the present invention.

Referring to FIG. 4, another method for creating a ring network LSP according to an embodiment of the present invention may include:

401: Each node advertises and collects network topology information.

In a feasible implementation manner, each node on a ring network, for example, may implement advertisement and discovery of a ring network topology by using an interior gateway protocols (IGP) or another protocol, so that each node on the ring network may learn a ring network topology structure. For example, a ring identifier (Ring ID) may be configured for an interface of each node, where the Ring ID may identify a home ring of each node and an interface of each node (namely, a ring network to which each node and the interface of each node belong). Each node, for example, may advertise a Ring ID of the interface of each node as a part of an interface parameter to another network node through a type-length-value (TLV) field (or another field) of an extended IGP protocol message, thereby enabling another node (for example, a router) in the network to learn which interfaces of which nodes in the network are located in a same ring network (Ring IDs are the same).

402: According to the collected network topology information, each node calculates a shortest path to another node and takes it as a primary path; and calculates a shortest path to the another node which does not pass through a next hop node of the foregoing shortest path and takes it as a backup path.

The following takes that a node C initiates creation of primary and backup paths to a node A as an example.

The node C may determine, according to the collected network topology information, that the node C is located in the same ring network as nodes A, B, D, E, and F. Therefore, according to the collected network topology information, the node C may utilize a constraint shortest path first (CSPF, Constraint Shortest Path First) protocol and another routing calculating protocol to calculates a shortest path (C-B-A) to the node A and takes it as a primary path, and to calculate a shortest path to the node A which does not pass through a next hop node (the node B) of the foregoing shortest path and takes it as a backup path (C-D-E-F-A). Certainly, the node C may also determine the primary and backup paths to the node A (and to all the other nodes) in another other existing manner.

403: The node C sends a Path message to a node on the primary path from the node C to the node A, so as to trigger to create a primary LSP from the node C to the node A; and the node C sends a Path message to a node on the backup path from the node C to the node A, so as to trigger to create a secondary LSP from the node C to the node A.

The node C sends the Path message to nodes along the primary path (C-B-A), so as to trigger to create the primary LSP (for example, referred to as an LSP-ca1) from the node C to the node A. The Path message, for example, may carry an indication of allowing LSP merging, so as to indicate that an LSP that the Path message triggers to create allows to be merged (merge), according to which other nodes may learn that merging is allowed for identical path segments between the LSP-ca1 that the Path message triggers to create and an LSP that another node triggers to create and having the same destination node. The indication of allowing LSP merging may include, for example, a ring identifier (Ring ID), so as to indicate that the LSP is initiated by a node on a ring network. Herein, it is assumed that identical path segments (where, all nodes on the identical path segments are also nodes on the same ring network) of LSPs initiated by nodes on the same ring network and having the same destination node (where the destination node is also a node on the same ring network) are allowed to be merged. Certainly, the Path message may also not carry an indication of allowing LSP merging. At this time, if another nodes on the ring network is informed that the Path message is initiated by a node on the ring network, it may be considered by default that merging processing is allowed for identical path segments between the LSP that the Path message triggers to create and an LSP that another node on the ring network triggers to create and having the same destination node. Alternatively, at this time, another node on the ring network may also directly allow, by default, merging processing on identical path segments between the LSP that the Path message triggers to create and an LSP that another node triggers to create and having the same destination node.

The node C sends the Path message to nodes along the backup path, so as to trigger to create the secondary LSP (referred to as an LSP-ca2) from the node C to the node A. Similarly, the Path message, for example, may also carry an indication of allowing LSP merging (for example, a Ring ID).

In addition, the Path message, for example, may further carry information such as a session object (SESSION object), a sender template object (SENDER_TEMPLATE object), and a session attribute object (SESSION_ATTRIBUTE object).

Information carried in the Path message initiated by the node C, for example, may mainly describe the last node (the node A) and the first node (the node C) of the LSP-ca1 created under triggering, an LSP-ca1 identifier, a corresponding tunnel (Tunnel) identifier, an LSP-ca1 attribute (for example, required bandwidth), and so on.

The node C may also create a Path state information block (Path State Block) locally. The node C may create Path State Blocks for the primary path and the backup path to the node A, respectively (the primary path and the backup path are in opposite directions). The Path State Block created for the LSP-ca1 may store the description information of the last node (the node A) and the first node (the node C) of the LSP-ca1, the LSP-ca1 identifier, and the corresponding Tunnel identifier carried in the corresponding Path message. The Path State Block may further store the description information of the LSP-ca1 attribute (for example, required bandwidth). Similarly, Path State Block created by the node C for the LSP-ca2 may store description information of the last node (the node A) and the first node (the node C) of the LSP-ca2, an LSP-ca2 identifier, and a corresponding Tunnel identifier carried in the corresponding Path message. The Path State Block may further store description information of an LSP-ca2 attribute (for example, required bandwidth).

404: A node through which the Path message passes creates a Path state information block for an LSP passing through the node.

When the Path message sent by the node C for triggering to create the LSP-ca1 of the path C-B-A reaches the node B, the node B creates a Path State Block locally for the LSP-ca1 (C-B-A). The Path message used for creating the LSP-ca1 is continuously sent to the downstream node A. The node A is a ring egress node (Egress), namely, the last node of the LSP-ca1. The Path State Block created locally by the node B for the LSP-ca1 may store description information of the last node (the node A) and the first node (the node C) of the LSP-ca1, an LSP-ca1 identifier, and a corresponding Tunnel identifier carried in the corresponding Path message. In addition, the Path State Block may further store description information of an LSP-ca1 attribute (for example, required bandwidth).

Similarly, when the Path message sent by the node C for triggering to create the LSP-ca2 of the path C-D-E-F-A reaches other nodes (the nodes D, E, and F) along the path, the nodes D, E, and F create Path State Blocks for the LSP-ca2 locally and continuously send, to a downstream node, the Path message for creating the LSP-ca1. The Path State Blocks created locally by the nodes D, E, and F for the LSP-ca2 may store description information of the last node (the node A) and the first node (the node C) of the LSP-ca2, an LSP-ca1 identifier, and a corresponding Tunnel identifier carried in the corresponding Path message. In addition, the Path State Blocks may further store description information of an LSP-ca2 attribute (for example, required bandwidth).

Similarly, after receiving the Path message used for creating the LSP-ca1, the node A creates a Path State Block for the LSP-ca1 locally. The Path State Block may store description information of the last node (the node A) and the first node (the node C) of the LSP-ca1, an LSP-ca1 identifier, and a corresponding Tunnel identifier. In addition, the Path State Block may further store description information of an LSP-ca1 attribute (for example, required bandwidth).

The node A is the last node of the LSP-ca1. The node A allocates a label to the LSP-ca1 and reserve a resource (for example, reserve required bandwidth), sends a Resv message in a direction opposite to that of a corresponding Path message, and creates a Resv state information block (Reservation State Block) locally. The Reservation State Block includes description information of a label allocated by the node A to the LSP-ca1. The node A returns a Resv message to the node B. The Resv message carries the description information of the label allocated by the node A to the LSP-ca1, and may further carry the description information of the resource reserved by the node A for the LSP-ca1 (certainly, the description information of the resource reserved by the node A for the LSP-ca1 may not be carried, and the node B, after receiving the Resv message, takes it by default that the required resource is already reserved by the node A). The node B receives the Resv message and then creates a Resv state information block (Reservation State Block) locally. The Reservation State Block may include description information of the label allocated by the node A to the LSP-ca1 and a next hop node (namely, the node A), and may further include description information of the resource reserved by the node A for the LSP-ca1. The node B allocates a label to and reserves a resource for the LSP-ca1, returns a Resv message to the node C. The Resv message includes description information of the label allocated by the node B to the LSP-ca1. The node C receives the Resv message and then creates a Reservation State Block. The Reservation State Block includes the description information of the label allocated by the node B to the LSP-ca1 and a next hop node (namely, the node B), and may further include description information of the resource reserved by the node B for the LSP-ca1.

So far, creation of the LSP-ca1 (C-B-A) is complete.

Similarly, after receiving the Path message used for creating the LSP-ca2, the node A creates a Path State Block for the LSP-ca2 locally. The Path State Block may store description information of the last node (the node A) and the first node (the node C) of the LSP-ca2, an LSP-ca2 identifier, and a corresponding Tunnel identifier. In addition, the Path State Block may further store description information of an LSP-ca2 attribute (for example, required bandwidth).

Similarly, the node A is the last node of the LSP-ca2. After receiving the corresponding Path message, the node A allocates a label to and reserves a resource for the LSP-ca2, and sends a Resv message in a direction opposite to that of the Path message. The node A returns a Resv message to an upstream node F. The Resv message carries information of the label allocated by the node A to the LSP-ca2. The node F receives the Resv message and then creates locally a Resv state information block, which includes the description information of the label allocated by the node A to the LSP-ca2 carried in the Resv message, and further includes description information of a next hop node (namely, the node A) and the resource reserved by the node A for the LSP-ca2. The node F further locally allocates a label to and reserves a resource for the LSP-ca2, and returns a Resv message to a node E. The Resv message includes description information of the label allocated by the node F to the LSP-ca2. Similarly, an upstream node, for example, the node E and a node D, of the node F receives the Resv message, and then similarly creates a Resv state information block locally in the foregoing manner. The Resv state information block may include the description information of the label of the LSP-ca2, and may further include description information of a next hop node and a resource reserved by the next hop node for the LSP-ca2. The node E and the node D further locally allocate a label to and reserve a resource for the LSP-ca2. The node D returns a Resv message to an upstream node C (the first node). The Resv message includes description information of the label allocated by a downstream node of the first node to the LSP-ca2. The node C receives the Resv message from the node D and creates a Resv state information block. So far, creation of the LSP-ca2 C-D-E-F-A) is complete.

Similarly, another node may also calculate a primary path and a backup path to another node according to collected network topology information and based on the foregoing example mechanism.

The following takes the node D as an example.

According to the collected network topology information, the node D calculates a shortest path to another node and takes it as a primary path; and calculates a shortest path to the another node which does not pass through a next hop node of the foregoing shortest path and takes it as a backup path.

The following takes that the node D initiates creation of primary and backup paths to the node A as an example.

The node D may determine, according to the collected network topology information, that the node D is located in the same ring network as nodes A, B, C, E, and F. Therefore, according to the collected network topology information, the node D may utilize a CSPF protocol and another routing calculating protocol to calculate a shortest path (for example, D-C-B-A) from the node D to the node A and takes it as a primary path, and to calculate a shortest path to the node A which does not pass through a next hop node (namely, the node C) of the foregoing shortest path and takes it as a backup path (namely, D-E-F-A). Certainly, the node D may also determine the primary and backup paths to the node A (and to all the other nodes) in another existing manner.

405: The node D sends a Path message to a node on the primary path from the node D to the node A, so as to trigger to create a primary LSP from the node D to the node A; and the node D sends a Path message to a node on the backup path from the node D to the node A, so as to trigger to create a secondary LSP from the node D to the node A.

Similarly, the node D sends a Path message to nodes along the primary path, so as to trigger to create a primary LSP (for example, referred to as an LSP-da1) from the node D to the node A. The Path message, for example, may carry an indication of allowing LSP merging (for example, including a Ring ID), so as to indicate that an LSP that the Path message triggers to create allows to be merged, according to which other nodes may learn that merging is allowed for the LSP that the Path message triggers to create and another LSP that another node triggers to create (certainly, the Path message may also not carry an indication of allowing LSP merging, and the other nodes take it by default that merging is allowed for identical path segments between the LSP that the Path message triggers to create and an LSP created by another node and having the same destination node). The node D sends the Path message to nodes along the backup path, so as to trigger to create the secondary LSP (for example, referred to as an LSP-da2) from the node D to the node A. Similarly, the Path message, for example, may also carry an indication of allowing LSP merging (for example, including a Ring ID).

406: A node through which the Path message passes creates a Path state information block for the corresponding LSP from the node D to the node A and passing through the node; and a node through which the Resv message passes creates a Resv state information block for the corresponding LSP from the node D to the node A and passing through the node.

The following mainly takes the node C as an example.

When the Path message sent by the node D (the first node) for triggering to create an LSP-da1 with a path D-C-B-A reaches the downstream node C (an intermediate node), the node C may create locally a Path state information block for the LSP-da1. After receiving the Path massage, the node C discovers, according to information carried in the Path message, that the LSP-da1 and the LSP-ca1 (C-B-A) have the same last node and downstream path. Therefore, the node C may merge the Path state information block corresponding to the LSP-da1 (D-C-B-A) and the Path state information block corresponding to the LSP-ca1 (C-B-A), store description information of the first nodes, the last nodes, and the LSP attributes of the two LSPs. With regard to identical description information corresponding to the two LSPs, only one copy is stored (namely, de-duplication).

In particular, if the node C discovers, according to the information carried in the Path message, that the total resource requirement on the downstream path of the LSP-da1 and each the created and merged LSP (which is the LSP-ca1) keeps unchanged compared to the resource requirement of the created and merged LSP (which is the LSP-ca1) (for example, required bandwidth of the LSP-da1 is not designated), the node C may not send, to a downstream node, a Path message for creating the LSP-da1. The node C may directly allocate a label to the LSP-da1 and then directly returns a Resv message to the upstream node D (the first node). The Resv message carries description information of the label allocated by the node C to the LSP-da1. In this way, message exchange with the downstream node can be reduced, and automatic merging can be performed on identical path segments (including a path segment from the node C to the destination node) between the LSP-da1 and the LSP-ca1, as in this situation the identical path segments surely use the same path label. In this way, the LSP creation mechanism is further simplified.

The following takes that the node C sends, to a downstream node, a corresponding Path message used for creating an LSP-da1 (D-C-B-A) as an example for description.

In another application scenario, if the node C discovers, according to the information carried in the Path message, that the total resource requirement on the downstream path of the LSP-da1 and the created and merged LSP (which is the LSP-ca1) changes (for example, becoming higher, for example, the total required bandwidth becomes higher, namely, the LSP-da1 also designates a resource requirement), compared with the resource requirement of the created and merged LSP (which is the LSP-ca1), the node C may continuously send, to the downstream node, the corresponding Path message for creating the LSP-da1 (D-C-B-A), so as to update the resource requirement. The downstream node B receives the Path message, locally creates a Path state information block for the LSP-da1, and according to a processing manner for merging Path state information blocks similar to that of the node C, performs merging on the Path state information block corresponding to the local LSP-da1 and the Path state information block corresponding to the previously created LSP-ca1 (C-B-A) and stores description information of the first nodes, the last nodes, and the LSP attributes of the two LSPs. With regard to identical description information corresponding to the two LSPs, only one copy is stored.

Similarly, the node B discovers, according to the information carried in the Path message, that the total resource requirement on the downstream path of the LSP-da1 and the created and merged LSP (which is the LSP-ca1) changes (for example, becoming higher, for example, the total required bandwidth becomes higher), compared with the resource requirement of the created and merged LSP (which is the LSP-ca1), the node B may continuously send, to the downstream node A, the corresponding Path message for creating the LSP-da1 (D-C-B-A), so as to update the resource requirement.

Similarly, the node A receives the Path message for triggering to create the LSP-da1 and then locally creates a Path State Block for the LSP-da1. According to a manner of merging Path state information blocks similar to that of the upstream node, the node A may merge the Path state information block corresponding to the local LSP-da1 (D-C-B-A) and the Path state information block corresponding to the previously created LSP-ca1 (C-B-A), and store description information of the first nodes, the last nodes, and the LSP attributes of the two LSPs. With regard to identical description information of the corresponding two LSPs, only one copy is stored.

The node A is the last node of the LSP-da1. The node A allocates a label to and reserves a resource for the LSP-da1 (the node A takes the label allocated to the LSP-ca1 as a label allocated to the LSP-da1, that is, the node A allocates a same path label to the LSP-da1 and the LSP-ca1). The node A locally creates a Resv state information block corresponding to the LSP-da1 and may merge the Resv state information block corresponding to the locally created LSP-da1 and the Resv state information block corresponding to the LSP-ca1. The node A sends a Resv message in a direction opposite to that of the corresponding Path message. The node A returns a Resv message to the node B, carrying description information of the label allocated by the node A to the LSP-da1 (equivalent to the label allocated by the node A to the LSP-ca1).

The node B receives the Resv message and then allocates a label to and reserves a resource for the LSP-da1 (the node B takes the label allocated to the LSP-ca1 as a label allocated to the LSP-da1, that is, the node B allocates the same label to the LSP-da1 and the LSP-ca1). The node B locally creates a Resv state information block for the corresponding LSP-da1 and merges the Resv state information block corresponding to the locally created LSP-da1 and the Resv state information block corresponding to the LSP-ca1. The merged Resv state information block may include description information of the label (which is also the label of the LSP-ca1) allocated by the downstream node to the LSP-da1, the next hop node (the node A), and the resource reserved for the LSP-ca1. The node B returns a Resv message to the node C. The Resv message includes information of a label allocated by the node B to the LSP-da1 (the same as the label of the LSP-ca1).

The node C receives the Resv message and allocates a label and a resource to the LSP-da1. The node C locally creates a Resv state information block corresponding to the LSP-da1 and merges the Resv state information block corresponding to the local LSP-da1 and the Resv state information block corresponding to the LSP-ca1. The merged Resv state information block includes description information of the label allocated by the downstream node to the LSP-da1 (the same as the label by the downstream node to the LSP-ca1), the next hop node (the node B), and the resource reserved for the LSP-ca1. The node C returns a Resv message to the node D. The Resv message includes information of the label allocated by the node C to the LSP-da1.

The node D receives the Resv message. The node D locally creates a Resv state information block corresponding to the LSP-da1. So far, creation of the LSP-da1 (C-B-A) is complete.

It can be seen that, by means of merging of Resv state information blocks and merging of Path state information blocks, LSPs to the node A that are initiated by all nodes on the ring network are merged into two ring LSPs (in reverse directions). Therefore, each node on the path of each corresponding ring LSP only needs to create one Path state information block and one Resv state information block, and each node along the path only needs to allocate one label to the merged LSPs, which helps greatly reduce the number of LSP states and in the number of the used labels, and further reduces an overhead of control information.

After the LSP-da1 and the LSP-ca1 are created, the node C, the node B, and the node A may also merge the Path messages and/or the Resv messages used for state refreshing and corresponding to identical path segments and then send the messages (for example, the node C, the node B, and the node A may merge the Path messages and/or the Resv messages used for state refreshing and corresponding to the LSP-da1 and the LSP-ca1, and then send the messages). For example, the node C may generate, based on the merged Path state information block, a Path message used for state refreshing and send the message to the downstream node (where the Path message may carry description information of source nodes (two) and a destination node of all the LSPs with identical path segments merged, and is used for refreshing the state of the merged LSPs). The node C, the node B, and the node A may also generate, based on the merged Resv state information block, a Resv message used for state refreshing and send the message to the upstream node (where the Resv message carries description information of source nodes (two) and a destination node of all the LSPs with identical path segments merged), so as to refresh the state of the merged LSPs. In this way, the number of messages exchanged between all nodes along the path of the LSPs can be reduced. Certainly, all the nodes passed through by the LSPs may also merge the Path/Resv state information blocks only and still send Path/Resv messages used for state refreshing to each LSP separately.

Similarly, the node A receives the Path message sent for triggering to create the LSP-da2 and then sends a Resv message in a direction opposite to that of the Path message. The Resv message passes through the node F and the node E to the node D, so as to further complete creation of the LSP-da2. In a manner similar to that of merging Resv state information blocks and the merging Path state information blocks by a node that passes through by the LSP-da1, the node A, the node F, the node E, and the node D merge the corresponding Resv state information blocks and merge the corresponding Path state information blocks of the LSP-da2 and the LSP-ca2, and allocate the same path labels to identical path segments, respectively, and details are not repeatedly described herein.

Similarly, when a Path message of another node and used for triggering to create an LSP to the node A passes through the node B and the node F, the node B and the node F may perform merging processing on local state information blocks in a similar manner. It can be understood that all LSPs on the ring network from all nodes to the node A through the node B are finally merged at the node B, and all LSPs from all nodes to the node A through the node F are merged at the node F. Similar to the processing of the node B, another node on the ring network may also perform merging on identical path segments of all LSPs which pass through the node to the same last node and have the same downstream path. It can be understood that the final effect of merging LSPs by each node is that on the whole ring network, all LSPs from other nodes to the node A may be considered two Ring LSPs, primary and secondary, and the directions of the primary and secondary Ring LSPs are different.

Similarly, another node may also calculate a primary path and a backup path to another node according to collected network topology information and based on the foregoing example mechanism.

According to the foregoing mechanism, each node on the ring network is used as the destination node, and each node only creates two Ring LSPs. Therefore, assuming that a ring including N nodes, only a total of 2N (primary+secondary; N is the number of nodes on the ring network) Ring LSPs are required to implement uplink or downlink communication, or communication between any nodes on the ring network.

After each node on the ring network is used as the last node and two Ring LSPs are created, if a fault occurs on a node or a link along the forwarding path, a node which senses the fault automatically switches to a protection path for traffic forwarding; and after the fault is rectified, the traffic is automatically switched back to the primary path.

The following describes failover by taking the following figure as an example.

It is assumed that the downlink traffic is sent from the node D to the node A along the primary Ring LSP (L1) and then flows out of the ring.

It is assumed that a fault occurs on the link between the node F and the node E. At this time, if the node D does not sense the fault, traffic is continuously forwarded by the node D to the node E.

If the node E senses the fault, the traffic is switched by the node E to the secondary Ring LSP (L2) which takes the node A as the egress node, and directly flows out of the ring when reaching the node A (the traffic path is E-D-C-B-A). However, in the prior art, if a similar fault occurs, the traffic needs to first bypass the node A to reach the node F which senses the fault and then switched back to the primary path of F-A (the traffic path is E-D-C-B-A-F-A), namely, traffic bypasses between the node A and the node F.

The node E may advertise the fault to the node D.

After the node D senses fault information, the subsequent traffic is forwarded from the node D and along the secondary Ring LSP (L2) which takes the node A as the last node, which prevents the traffic from bypassing between D and E.

After the fault is rectified, the node E advertises it to the node D, and the subsequent traffic from the node D may be continuously forwarded along the primary Ring LSP (L1).

It can be seen from the foregoing that, in this embodiment, a node in a ring network allocates a same path label to identical path segments of LSPs passing through the node and having a same destination node, so as to merge identical path segments of LSPs having a same destination node on the ring network, which helps greatly reduce the number of LSPs to be created and maintained by each node on the ring network, and further reduces the LSP control overhead.

It should be noted that, for ease of description, the forging method embodiments are described as a combination of a series of actions. A person skilled in the art should be aware that the present invention is not limited by the sequence of the described actions. According to the present invention, some steps may be implemented in another sequence or be simultaneously performed. Additionally, a person skilled in the art may also be aware that, the embodiments described in the specification all belong to preferable embodiments, in which an action and a module involved are not necessarily essential to the present invention.

To better implement the foregoing solutions of the embodiments of the present invention, the following provides a related apparatus for implementing the foregoing solutions.

Referring to FIG. 6-*a*, an embodiment of the present invention provides a network node 600, which may include:

a receiving module 610, a label allocating module 620, and a sending module 630.

The receiving module 610 is configured to receive a first Path message used for creating a first label switched path from a second node.

The label allocating module 620 is configured to allocate a first label to the first label switched path.

The sending module 630 is configured to send a first Resv message carrying the first label to the second node.

The label allocating module 620 is further configured to: when the receiving module 610 receives a second Path message used for creating a second label switched path from the second node and determines that a destination node of the second label switched path is the same as that of the first label switched path, and the network node 600, the second node, and the destination node are located in a same ring network, allocate the first label to the second label switched path.

The sending module 630 is further configured to send, to the second node, a second Resv message carrying the first label allocated to the second label switched path by the label allocating module 620.

Referring to FIG. 6-*b*, in an application scenario, the network node 600 may further include: a Path state information block creating module 640 and a first information block merging module 650.

The Path state information block creating module 640 is configured to: after the receiving module 610 receives the first Path message from the second node and used for creating the first label switched path, create a Path state information block for the first label switched path; and after the receiving module 610 receives the second Path message from the second node and used for creating the second label switched path, create a Path state information block for the second label switched path.

The first information block merging module 650 is configured to merge the Path state information blocks created for the first label switched path and the second label switched path by the Path state information block creating module 640.

In an application scenario, the sending module 630 is further configured to: after the receiving module 610 receives the first Path message from the second node and used for creating the first label switched path, send, to a downstream node of the first label switched path, a Path message used for creating the first label switched path.

Referring to FIG. 6-*c*, the network node 600 may further include: a Resv state information block creating module 660 and a second information block merging module 670.

The Resv state information block creating module 660 is configured to: when the receiving module 610 receives, from the downstream node of the first label switch path, a third Resv message corresponding to the first label switched path, create a Resv state information block for the first label switched path.

The sending module 630 is further configured to: after the receiving module 610 receives the second Path message from the second node and used for creating the second label switched path, send, to a downstream node of the second label switched path, a Path message for creating the second label switched path.

The Resv state information block creating module 660 is configured to: when the receiving module 610 receives, from the downstream node of the second label switch path, a fourth Resv message corresponding to the second label switched path, create a Resv state information block for the second label switched path.

The second information block merging module 670 is configured to merge the Resv state information blocks created for the first label switched path and the second label switched path by the Resv state information block creating module 660.

Referring to FIG. 6-*d*, in an application scenario, when the network node 600 is an intermediate node of the second label switched path, the network node 600 further includes:

a determining module 680, configured to: after the receiving module 610 receives the second Path message from the second node and used for creating the second label switched path, determine whether a resource requirement of the second label switched path is not designated, and if the resource requirement of the second label switched path is not designated, skip sending the second Path message to a downstream node of the second label switched path.

Referring to FIG. 6-*e*, in an application scenario, the network node 600 may further include:

an advertising module 691 and/or a topology collecting module 692.

The advertising module 691 is configured to advertise a ring identifier corresponding to the network node or at least one interface of the network node.

The topology collecting module 692 is configured to collect network topology information, where the network topology information includes: a ring identifier that is advertised by at least another one node in a same ring network where the network node is located and is corresponding to the at least another one node or at least one interface of the at least another one node.

In an application scenario, after the LSPs are created and merged, the network node 600 may merge Path messages and/or Resv messages corresponding to identical path segments and used for state refreshing, and then send the messages (for example, the network node 600 may merge Path messages and/or Resv messages corresponding to the first LSP and the second LSP and used for state refreshing, and then send the messages). For example, the sending module 630 may be further configured to generate, based on the merged Path state information block, a Path message (where the Path message may carry description information of source nodes (multiple) and a destination node (one) of all the LSPs with identical path segments merged, and is used for refreshing the state of the merged LSPs) used for state refreshing and send the Path message to a downstream node. Similarly, the sending module 630 may be further configured to generate, based on the merged Resv state information block, a Resv message (where the Resv message may carry description information of source nodes (multiple) and a destination node (one) of all the LSPs with identical path segments merged, and is used for refreshing the state of the merged LSPs) used for state refreshing, and send the Resv message to an upstream node. In this way, the number of messages exchanged between all the nodes along the LSPs can be greatly reduced. Certainly, all the nodes passed through by the LSPs may also merge the Path/Resv state information blocks only and still send Path/Resv messages used for state refreshing to each LSP separately.

It can be understood that, the network node 600 in this embodiment may be a node in the ring network in the foregoing method embodiments. The network node 600 may be, for example, the first node in the method embodiments, or may be the node B in the method embodiments, or may be a node combining capabilities of all the nodes in the method embodiments, where the functions of all the functional modules can be specifically implemented according to the method in the method embodiments. For the specific implementation process, reference may be made to the related description in the method embodiments, and details are not repeatedly described herein.

An embodiment of the present invention further provides a communications system, including:

a second node and a network node 600, where the second node and the network node 600 are connected in a communicable manner.

In the foregoing embodiments, the description in each embodiment has its own focus. For the part that is not described in a certain embodiment, reference may be made to relevant descriptions in other embodiments.

To sum up, in the embodiments of the present invention, a first node receives a first Path message used for creating a first label switched path from a second node; allocates a first label to the first label switched path; sends a first Resv message carrying the first label to the second node; and when the first node receives a second Path message used for creating a second label switched path from the second node and determines that a destination node of the second label switched path is the same as that of the first label switched path, and the first node, the second node, and the destination node are located in a same ring network, allocates the first label to the second label switched path; and sends, to the second node, a second Resv message carrying the first label allocated to the second label switched path. Based on this mechanism, a node in a ring network allocates a same path label to identical path segments of LSPs passing through the node and having a same destination node, so as to merge identical path segments of LSPs having a same destination node on the ring network, which helps greatly reduce the number of LSPs to be created and maintained by each node on the ring network, and further reduces the LSP control overhead.

Further, a node in the ring network merges Path state information blocks and Resv state information blocks created for identical path segments of LSPs passing through the node and having a same destination node, thereby facilitating a drop in the number of state information blocks to be maintained, and reducing control complexity.

Further, a node on an LSP may send a Path/Resv message used for state refreshing based on a merged Path/Resv state information block. That is to say, the periodical state information refreshing after an LSP is created may be performed for merged LSPs other than for each independent LSP, which helps greatly reduce the number of Path/Resv messages exchanged between nodes on the LSPs.

A person of ordinary skill in the art may understand that, all or a part of the steps of the methods in the foregoing embodiments may be implemented by a program instructing relevant hardware. The program may be stored in a computer readable storage medium. The storage medium may include: a read-only memory, a random access memory, a magnetic disk, or an optical disc.

The forgoing describes in detail the method for creating a ring network label switched path, the related device, and the communications system provided in the embodiments of the present invention. The principle and implementation manner of the present invention are described herein by using specific examples. The description about the embodiments of the present invention is merely intended to help understand the method and core ideas of the present invention. Variations may be made according to the ideas of the present invention by a person of ordinary skill in the art to specific implementation manners and application scopes. Therefore, the content of the specification shall not be construed as a limitation to the present invention.

What is claimed is:

1. A method for creating a ring network label switched path, comprising:
   receiving, by a first node, a first Path message used for creating a first label switched path from a second node;
   allocating, by the first node, a first label to the first label switched path;
   sending, by the first node, a first Resv message carrying the first label to the second node; and
   when the first node receives a second Path message used for creating a second label switched path from the second node and determines that a destination node of the second label switched path is the same as that of the first label switched path, and the first node, the second node, and the destination node are located in a same ring network, allocating, by the first node, the first label to the second label switched path; and sending, to the second node, a second Resv message carrying the first label allocated to the second label switched path.

2. The method according to claim 1, wherein
   the first Path message carries a ring identifier of a ring network where a source node corresponding to the first label switched path is located; the second Path message carries a ring identifier of a ring network where a source node corresponding to the second label switched path is located; and the ring identifier of the ring network where the source node corresponding to the first label switched path is located is the same as the ring identifier of the ring network where the source node corresponding to the second label switched path is located.

3. The method according to claim 1, wherein:
after the receiving, by a first node, a first Path message used for creating a first label switched path from a second node, the method further comprises: creating, by the first node, a Path state information block for the first label switched path; and
after the first node receives the second Path message used for creating the second label switched path from the second node, the method further comprises: creating, by the first node, a Path state information block for the second label switched path, and merging the Path state information blocks created for the first label switched path and the second label switched path.

4. The method according to claim 3, further comprising:
generating, by the first node, according to the merged Path state information blocks, a Path message used for path state refreshing, and sending the Path message.

5. The method according to of claim 1, wherein
after the receiving, by a first node, a first Path message used for creating a first label switched path from a second node, the method further comprises: sending, by the first node to a downstream node of the first label switched path, a Path message used for creating the first label switched path; and when the first node receives, from the downstream node of the first label switch path, a third Resv message corresponding to the first label switched path, creating, by the first node, a Resv state information block for the first label switched path; and
after the the first node receives the second Path message used for creating the second label switched path from the second node, the method further comprises: sending, by the first node to a downstream node of the second label switched path, a Path message used for creating the second label switched path; and when the first node receives, from the downstream node of the second label switch path, a fourth Resv message corresponding to the second label switched path, creating, by the first node, a Resv state information block for the second label switched path, and merging the Resv state information blocks created for the first label switched path and the second label switched path.

6. The method according to claim 5, further comprising:
generating, by the first node, according to the merged Resv state information blocks, a Resv message used for path state refreshing, and sending the Resv message.

7. The method according to claim 1, wherein
when the first node is an intermediate node of the second label switched path,
after the first node receives the second Path message used for creating the second label switched path from the second node, the method further comprises:
determining, by the first node, whether a resource requirement of the second label switched path is not designated, and when the resource requirement of the second label switched path is not designated, skipping sending, by the first node, the second Path message to a downstream node of the second label switched path.

8. The method according to claim 1, comprising:
advertising, by the first node, a ring identifier corresponding to the first node or at least one interface of the first node;
and/or
collecting, by the first node, network topology information;
wherein the network topology information comprises: a ring identifier that is advertised by at least another one node in a same ring network where the first node is located and is corresponding to the at least another one node or at least one interface of the at least another one node.

9. A non-transitory computer-readable medium storing computer-executable instructions that, when executed by a processor, cause the following to be performed:
receiving a first Path message used for creating a first label switched path from a second node;
allocating a first label to the first label switched path; and
sending a first Resv message carrying the first label to the second node;
wherein, when a second Path message used for creating a second label switched path is received from the second node and a destination node of the second label switched path is the same as that of the first label switched path, and the network node, the second node, and the destination node are located in a same ring network,
the allocating comprises allocating the first label to the second label switched path, and
the instructions, when executed by the processor, further cause the following to be performed: sending, to the second node, a second Resv message carrying the first label allocated to the second label switched path.

10. The non-transitory computer-readable medium according to claim 9, wherein the instructions, when executed by the processor, further cause the following to be performed:
receiving the first Path message from the second node and used for creating the first label switched path, creating a Path state information block for the first label switched path; and after receiving the second Path message from the second node and used for creating the second label switched path, creating a Path state information block for the second label switched path; and
merging the Path state information blocks created for the first label switched path and the second label switched path.

11. The non-transitory computer-readable medium according to claim 9, wherein the instructions, when executed by the processor, further cause the following to be performed:
after receiving the first Path message used for creating the first label switched path from the second node, sending, to a downstream node of the first label switched path, a Path message for creating the first label switched path;
when receiving, from the downstream node of the first label switch path, a third Resv message corresponding to the first label switched path, creating a Resv state information block for the first label switched path;
after receiving the second Path message used for creating the second label switched path from the second node, sending, to a downstream node of the second label switched path, a Path message for creating the second label switched path;
when receiving, from the downstream node of the second label switch path, a fourth Resv message corresponding to the second label switched path, creating a Resv state information block for the second label switched path; and
merging the Resv state information blocks created for the first label switched path and the second label switched path.

12. The non-transitory computer-readable medium according to claim 9, wherein
when the non-transitory computer-readable medium is included in an intermediate node of the second label switched path,
the instructions, when executed by the processor, further cause the following to be performed:

after receiving the second Path message used for creating the second label switched path from the second node, determining whether a resource requirement of the second label switched path is not designated, and when the resource requirement of the second label switched path is not designated, skipping sending the second Path message to a downstream node of the second label switched path.

13. The non-transitory computer-readable medium according to claim 9, wherein the instructions, when executed by the processor, further cause the following to be performed:
- advertising a ring identifier corresponding to the network node or at least one interface of the network node;

and/or
- a collecting network topology information, wherein the network topology information comprises: a ring identifier that is advertised by at least another one node in a same ring network where the network node is located and is corresponding to the at least another one node or at least one interface of the at least another one node.

* * * * *